May 5, 1959 F. G. CUESTA 2,884,983
SAFETY PNEUMATIC TIRE WHEEL
Filed June 17, 1957 2 Sheets-Sheet 1

INVENTOR.
Francisco Gonzalez Cuesta
BY Wenderoth, Lind &d Ponack
Attorneys

May 5, 1959　　　F. G. CUESTA　　　2,884,983
SAFETY PNEUMATIC TIRE WHEEL
Filed June 17, 1957　　　　　　　　　　　2 Sheets-Sheet 2
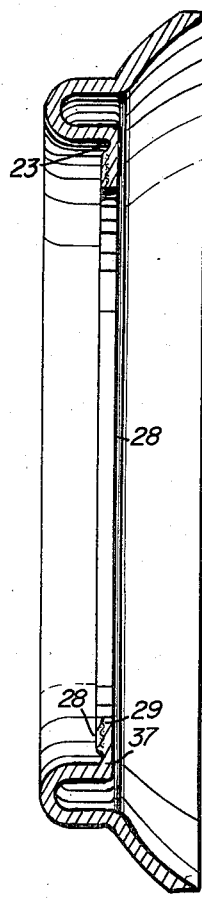
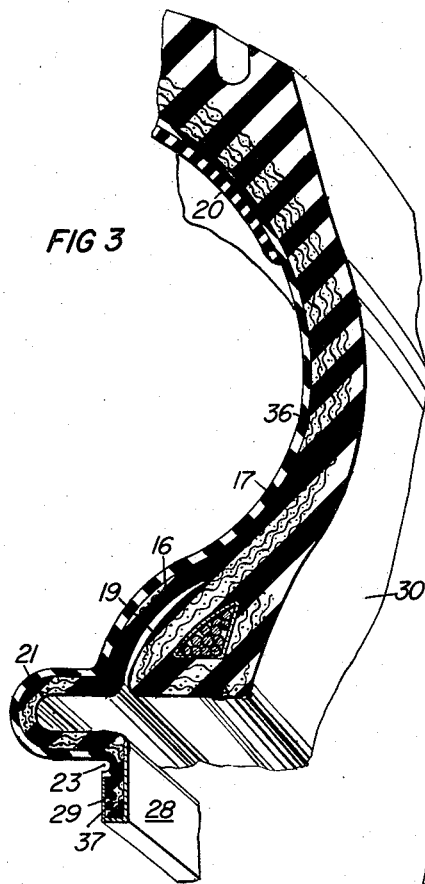
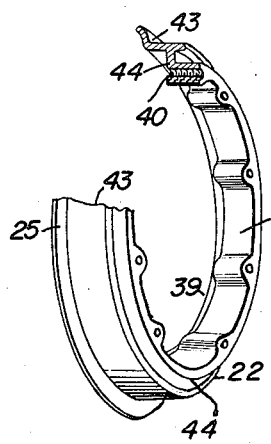
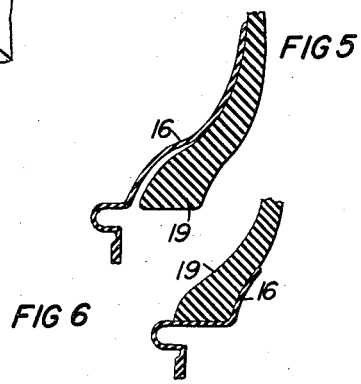
INVENTOR.
Francisco Gonzalez Cuesta
BY Wenderoth, Lind & Ponack
Attorneys

United States Patent Office 2,884,983
Patented May 5, 1959

2,884,983
SAFETY PNEUMATIC TIRE WHEEL

Francisco Gonzalez Cuesta, San Sebastian, Spain

Application June 17, 1957, Serial No. 665,935

Claims priority, application Spain September 6, 1952

5 Claims. (Cl. 152—363)

This invention relates to a safety pneumatic tire wheel, and more particularly to a safety pneumatic tire wheel for use with a so-called tubeless tire.

This application is a continuation-in-part of my application Serial No. 318,131, filed October 31, 1952, and now U.S. Patent No. 2,796,108 dated June 18, 1957.

The object of the present invention is to provide a tire wheel for use with tubeless tires which have flanges on the tire beads, which flanges extend from the beads and are clamped in airtight relationship between rim members and a central ring member so that the airtightness of the tire is not dependent on the action of the bead engaging portions of the rim members bearing against the beads.

A further object of the invention is to provide such a structure which is adaptable for use with conventional tube type tires in which such flanges can be attached to such conventional tires.

Other and further objects of the invention will become apparent from the following description and claims, taken together with the accompanying drawings, in which:

Fig. 3 is a perspective view, partially in section, of a part of a tire for use with the tire wheel according to the present invention;

Fig. 4 is a perspective view, partly in section and on a reduced scale, of a rim member of the safety pneumatic tire wheel according to the invention;

Fig. 5 is a diagrammatic view of one form of flange for use with a conventional tubeless tire to adapt it for use in the tire wheel of the present invention;

Fig. 6 is a diagrammatic view of a different method of adapting a conventional tubeless tire for use with the present invention;

Fig. 7 is a sectional view of a rim member of the safety pneumatic tire wheel of the present invention;

Figure 1:
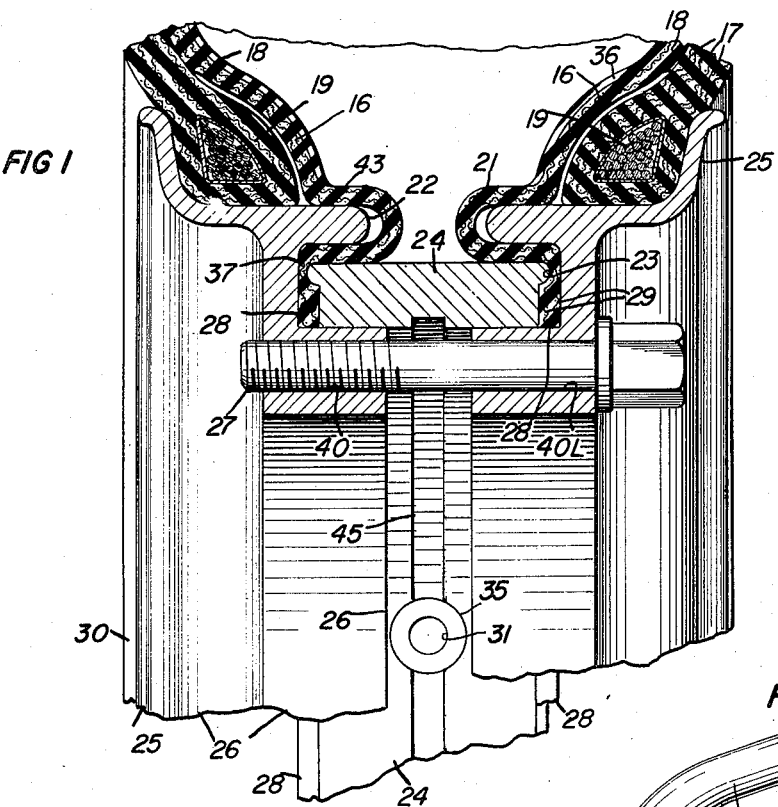
Fig. 1 is a partial sectional view through the safety pneumatic tire wheel according to the invention.
Figure 2:
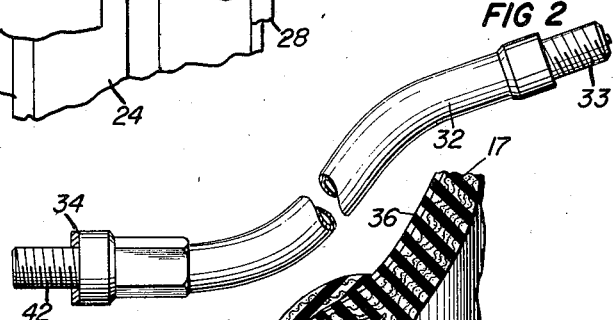
Fig. 2 is a side elevation view of the air inlet tube for the safety pneumatic tire wheel of Fig. 1.

The safety pneumatic tire wheel according to the invention comprises a pneumatic tire 30 having an impervious rubber outer portion 36 under which is a plurality of plies of cords, wires or metallic threads 17 assembled in a conventional manner. The tire has an inner coating of self sealing rubber 20 on the crown portion and on the side walls, and the beads 19 are conventional. Flanges 16 start on the inner walls of the tire just above the beads 19 and extend downwardly along both the inner side walls while at the same time being separated from the walls. At a point even with the tire beads 19, the flanges are deformed to provide folds 21 which extend toward each other. The flanges then depend radially inwardly of the tire ending in pressing edges 28 which are reinforced with cords or wires 29 so that they are inextensible. At the point where the pressing edges depend from the folds the flanges 16 have opposed notches 23. The flanges 16 may be made of an impervious cloth 37 reinforced with cords or the like.

The safety pneumatic tire wheel according to the invention also comprises a steel central ring 24 which is positioned between the pressing edges 28. On the periphery of the side edges of the central ring 24 are projections 24a which fit into the opposed notches 23. Central ring 24 has a tapped hole 31 therein surrounded by a seat 35. An air inlet tube may be provided having a stud 42 on one end thereof with a gasket 34 thereon. A conventional valve 33 is provided on the other end of the air inlet tube 32. The stud 42 is threaded into the hole 31 with the gasket 34 seated on seat 35.

Completing the safety tire wheel according to the invention are two rim members 26 and 26a which are substantially identical except that one is for one side of the wheel and the other for the other side. Rim members 26 and 26a have conventional bead retaining flanges 25 thereon and have peripheral surfaces 43 against which the bases of the beads 19 rest. On a level with the peripheral surfaces 43 are extensions 22 which extend into the folds 21 on the flanges 16, although these extensions do not reach the bottoms of the folds. The extensions 22 define recesses 44 between them and the body portions of the rim members 26 and 26a, said recesses 44 being opposed to each other and receiving said pressing edges 28 and the central ring 24. In the body portion of the rim member 26 are smooth bores 40L spaced around the circumference of the rim member. In the body portion of the rim member 26a are tapped bores 40 also spaced around the circumference of the rim member. Bolts 27 extend through the bores 40L and thread into bores 40 and draw rim members 26 and 26a toward each other, thereby pressing the pressing edges 28 against the side edges of the ring 24, thus sealing the interior of the tire.

The rim members 26 and 26a may be made of case steel or of aluminum with steel bead retaining flanges. They may also be made of cast iron plates welded together. Edge 39 may be beveled in order to secure it to the hub of the vehicle. An ordinary conventional disc can be welded onto either of the rim members 26 or 26a, or to the central ring 24, which has a channel 45 therein to center the disc.

In the assembly of the safety pneumatic tire wheel according to the invention, the central ring 24 is introduced between the pressing edges 28 with the projections 24a fitting into the notches 23. The rim members 26 and 26a are then placed over the outsides of the pressing edges 28 so that the extensions 22 project into the folds 21 and the recesses 44 surround the pressing edges 28 and the central ring 24. The bolts 27 are then introduced through the bores 40L and into the bores 40 and tightened until the interior of the tire is sealed. The air inlet tube 32 is then threaded into the hole 31 and tire inflated. Because the rim members 26 and 26a press the pressing edges 28 against central ring 24, the sealing of the tire does not depend on the action of the bead retaining flanges 25 against beads 19. Conventional tube tires which do not have specially formed beads can thus be adapted for use with this invention.

Figure 8:
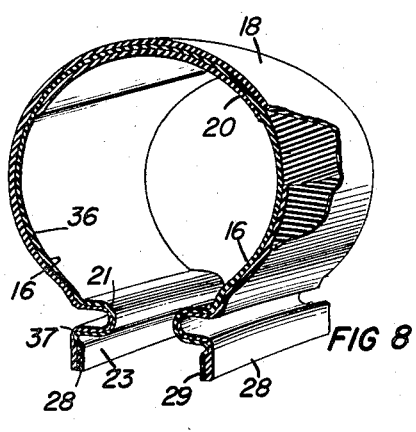
Fig. 8 is a perspective view, partly in section and on a reduced scale, of a tire liner for adapting a conventional tube tire for use with the tire wheel of the present invention.

The provision for the flanges 16 may be made in several ways. As seen in Fig. 8, they may be formed as part of a liner 18 which is made up of two or more plies of cords or metal threads and coated with rubber on both sides. The self sealing rubber portion 20 may be inserted as in a conventional tubeless tire. To incorporate it into a tube type tire, it may be molded together with the tire casing itself, or may be vulcanized to the tire casing subsequent to the molding of the tire, Obviously it can be made in sizes to correspond to the various sizes of tires.

Figure 9:
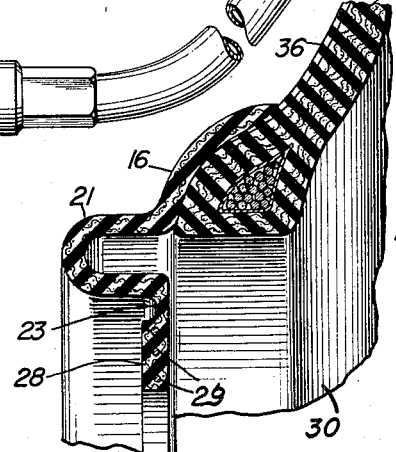
Fig. 9 is a detail view of Fig. 5.

Instead of the liner 18, the flanges 16 may be added directly to the tire casing of a tubeless tire by securing them to the inner walls of the tire casing above the beads, as seen in Figs. 5 and 9. Alternatively, the flanges may be secured along the base of the bead 19 and on the lower portions of the side wall of the tire, as seen in Fig. 6.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. A safety pneumatic tire wheel comprising a tire having flanges starting on both the inner side walls thereof and extending downwardly therealong and being separated from said side walls, said flanges having folds therein extending toward each other and having pressing edges depending from said folds, a central ring between said pressing edges, air inlet means in said central ring, two rim members each having bead retaining flanges thereon and each having a recess therein into which said pressing edges and said central ring fit, the edges of said recesses at the greater radial distance from the center of said wheel being formed by extensions projecting into said folds in said flanges, and securing means between said rim members drawing said rim members together and pressing said pressing edges against said center ring.

2. A safety pneumatic tire wheel comprising a tire having flanges starting on both the inner side walls thereof and extending downwardly therealong and being separated from said side walls, said flanges having folds therein extending toward each other and having pressing edges depending from said folds, said flanges having opposed notches therein at the point where said pressing edges depend from said folds, a central ring between said pressing edges, the periphery of the sides of said central ring having projections thereon fitting into said opposed notches, a valved air inlet tube extending through said central ring into said tire, two rim members each having bead retaining flanges thereon and each having a recess therein into which said pressing edges and said central ring fit, the edge of said recesses at the greater radial distance from the center of said wheel being formed by extensions projecting into said folds in said flanges, one of said rim members having smooth bores therein spaced around the circumference thereof and the other of said rim members having threaded bores therein spaced around the circumference thereof, and a plurality of bolts extending through said smooth bores and threaded into said threaded bores and drawing said rim members together and pressing said pressing edges against said center ring.

3. A safety pneumatic tire wheel as claimed in claim 2 in which said flanges are integral with said tire.

4. A safety pneumatic tire wheel as claimed in claim 2 in which said flanges are secured to the side walls of said tire.

5. A safety pneumatic tire wheel as claimed in claim 2 and further comprising a liner of rubber for said tire, said liner having said flanges formed as a part thereof.

References Cited in the file of this patent

UNITED STATES PATENTS

| 1,461,485 | Kern | July 10, 1923 |
| 2,016,150 | Lee | Oct. 1, 1935 |

FOREIGN PATENTS

| 27,687 | Great Britain | 1896 |